(12) United States Patent
Tatehata et al.

(10) Patent No.: US 6,560,067 B1
(45) Date of Patent: May 6, 2003

(54) FLEXIBLE DISC APPARATUS HAVING A MECHANISM FOR RESTRICTING THE DISTANCE A RECORDING MEDIUM IS DISCHARGED THEREFROM

(75) Inventors: Shoji Tatehata, Tokyo (JP); Kazuya Oda, Tokyo (JP); Kenji Shoji, Tokyo (JP); Kazunobu Hamatsu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/435,363

(22) Filed: Nov. 8, 1999

Related U.S. Application Data

(62) Division of application No. 09/126,442, filed on Jul. 30, 1998.

(30) Foreign Application Priority Data

Dec. 24, 1997 (JP) ............................................ 9-354755

(51) Int. Cl.⁷ ................................................ G11B 17/04
(52) U.S. Cl. ................................................. 360/99.02
(58) Field of Search ........................... 360/99.02, 99.06, 360/133; 369/77.2, 291

(56) References Cited

U.S. PATENT DOCUMENTS

| | | | | |
|---|---|---|---|---|
| 4,550,354 A | * | 10/1985 | Wakabayashi et al. | ...... 360/133 |
| 4,586,097 A | * | 4/1986 | Koike et al. | |
| 4,727,444 A | * | 2/1988 | Fukushima et al. | |
| 4,794,479 A | * | 12/1988 | Nakanishi | ................ 360/99.06 |
| 5,091,898 A | * | 2/1992 | Bessho et al. | ........... 360/99.06 |
| 5,216,558 A | * | 6/1993 | Griffith et al. | ........... 360/99.02 |
| 5,659,530 A | * | 8/1997 | Kurita | ..................... 360/99.06 |
| 5,666,343 A | * | 9/1997 | Ahn | ........................ 360/99.02 |
| 6,078,553 A | * | 6/2000 | Niioka et al. | .............. 369/77.2 |
| 6,188,661 B1 | * | 2/2001 | Arai et al. | ................. 369/77.2 |

FOREIGN PATENT DOCUMENTS

JP        U 64-35558        3/1989

* cited by examiner

Primary Examiner—Craig A. Renner
(74) Attorney, Agent, or Firm—Birch, Stewart, Kolasch & Birch, LLP

(57) ABSTRACT

A flexible disc apparatus comprising a frame having a recording medium loading portion, a carriage portion, and a recording medium unloading mechanism portion, which comprises a medium holding portion which is arranged to be moveable along the loading and unloading direction of the recording disc and is provided with a medium holding portion which engages with one portion of the recording disc to maintain the recording disc at a predetermined space along the loading and unloading direction.

4 Claims, 16 Drawing Sheets

$\alpha < \beta$ $\alpha < \beta$

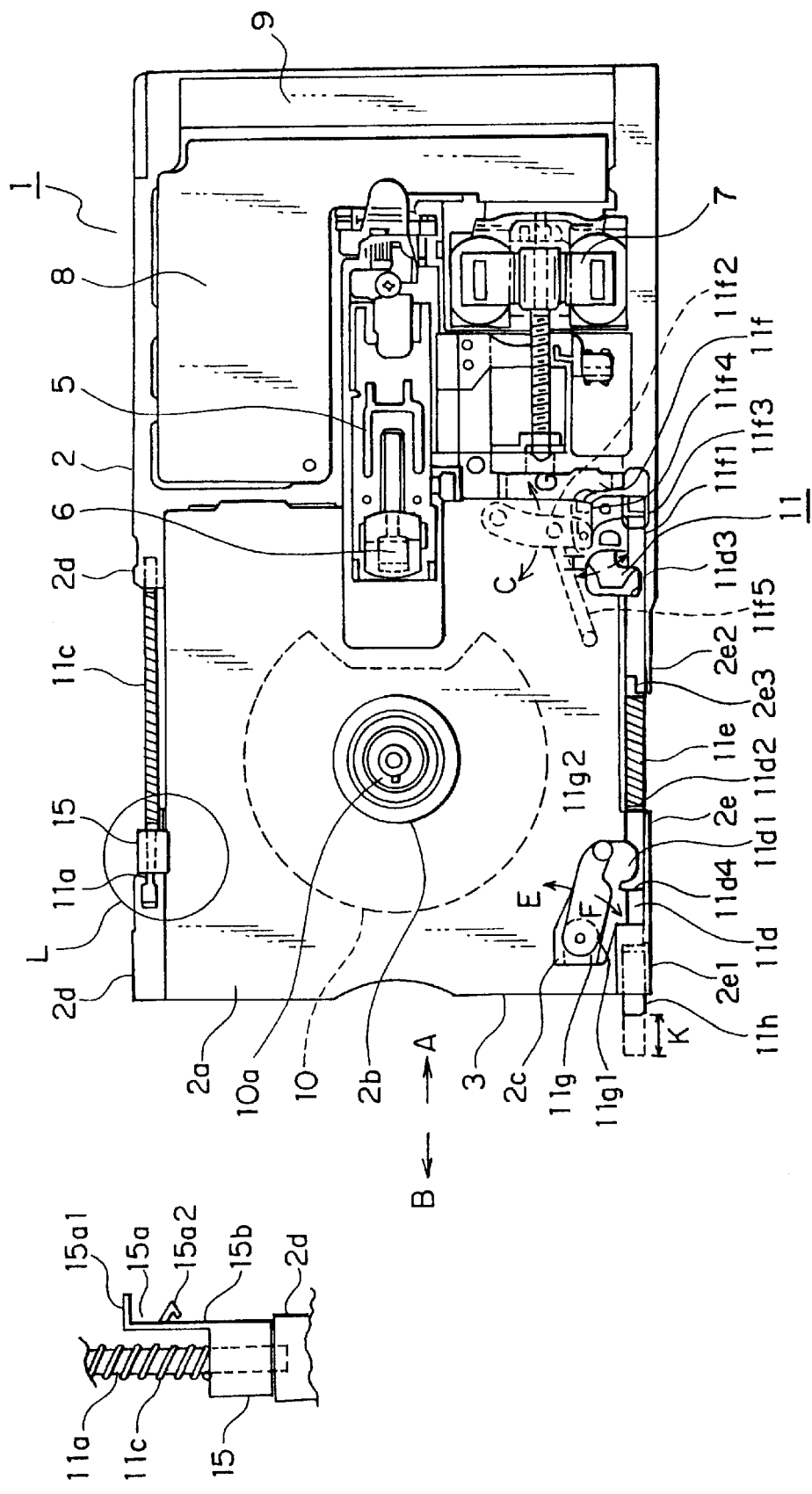

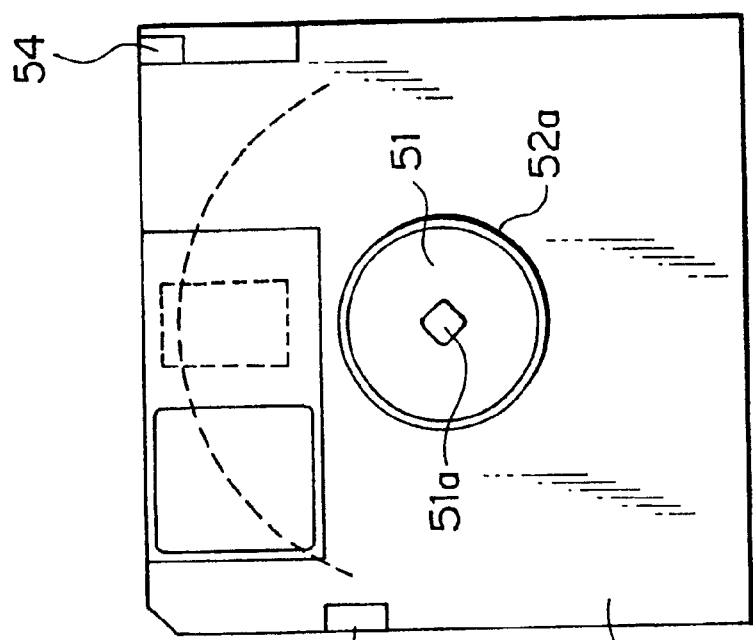
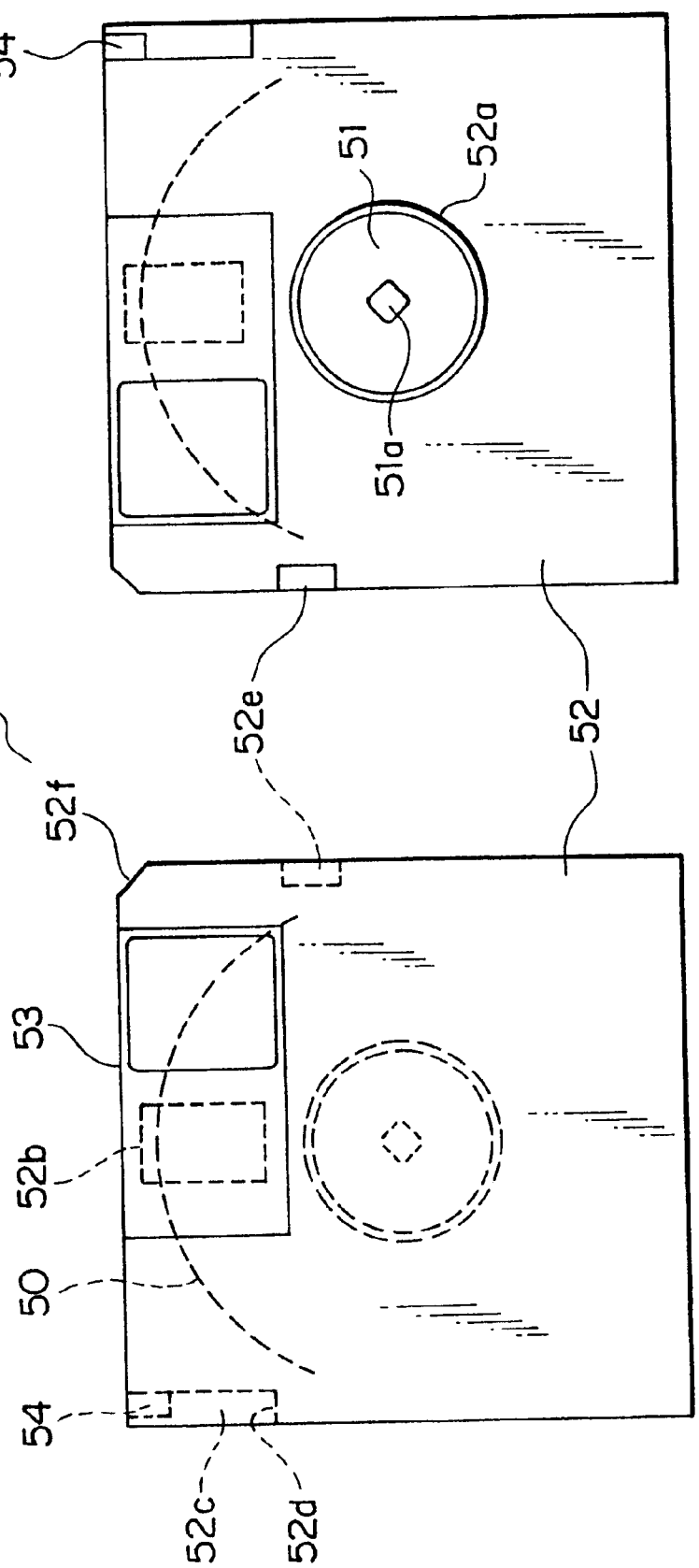

FLEXIBLE DISC APPARATUS HAVING A MECHANISM FOR RESTRICTING THE DISTANCE A RECORDING MEDIUM IS DISCHARGED THEREFROM

This application is a divisional of co-pending application Ser. No. 09/126,442, filed on July 30, 1998, the entire contents of which are hereby incorporated by reference.

BACKGROUND OF THE INVENTION

This invention relates to a flexible disc apparatus which limits the unloading (discharge) amount of the recording medium when it is being unloaded (discharged) from the apparatus.

FIG. 15a is an explanatory plan view showing the recording disc and FIG. 15b is an explanatory bottom view showing the recording disc. FIGS. 16a and 16b are explanatory views illustrating a conventional flexible disc apparatus.

In FIGS. 15a and 15b, 50 is a disc-shaped recording medium, 51 is a hub portion made of metal and secured to the central portion of the recording medium 50, 51a is a hole portion provided in the hub portion 51 to which a rotary shaft of a recording medium driving motor (not shown) is inserted. It is to be noted that the hole portion 51a is positioned substantially at the center of a recording disc 55. 52 is a medium cartridge portion for housing the recording medium 50 and 52a is a bore portion provided in the medium cartridge portion 52, which is formed to have a size capable of causing the hub portion 51 to project outwardly. 52b is a window portion provided in the medium cartridge portion 52, 52c is a groove portion provided in the medium cartridge portion 52, 52d is an end portion on the unloading direction B of the groove portion 52c, 52e is a hole portion provided in the side face of the medium cartridge portion 52 and 52f is a taper portion on the unloading direction A of the medium cartridge portion 52.

Also, 53 is a shutter for opening or closing the window portion 52b, 54 is a hook arranged to be movable in the groove portion 52c for opening and closing the shutter. The hook 54 is mechanically connected to the shutter 53 through a length of wire (not shown). 55 is a recording disc, which includes the components designated by the above reference numerals 50–54.

In FIGS. 16a and 16b, 60 is a frame, 61 is a carriage portion having a magnetic head (not shown), 62 is a drive motor for moving the carriage portion 61, 63 is a medium drive motor for rotating the recording medium 50, 64 is a medium unloading mechanism portion for releasing the recording disc 55, 64a is a guide shaft portion disposed in the medium unloading mechanism portion 64, 64b is a lever, 64c is an engagement spring of the lever, 64d is a spring portion for energizing the lever. 65 is a unloading amount restricting spring, 66 is a flexible disc apparatus, which includes the components designated by the above reference numerals 60–65.

Next, the operation of the above-described recording disc will be described. FIG. 17 is an explanatory view showing the recording medium loading and unloading motion (inserting and discharging motion). The same reference numerals as those shown in FIGS. 15a, 15b, 16a and 16b designate identical or corresponding components and their explanations will be omitted. It is to be noted that in this application both the loading direction A and the unloading direction, respectively B are generally referred to as loading and unloading direction.

The operation for loading the recording medium 55 will now be described. When the recording disc 55 is moved in the loading direction A to insert it into the flexible disc apparatus 66, the hook 54 abuts against the engagement spring 64c. A further loading of the recording disc 55 causes the shutter 53 to move to open the window portion 52b. That is, the engagement spring 64c is energized by the spring portion 64d through the lever 64b in the unloading direction B. so that the hook 54 is not allowed to move into the loading direction A and the hook 54 is positioned at the side of the unloading direction B by the spring portion 64d, so that the shutter 53 is moved via the wire (not shown) to open the window portion 52b.

Also, the unloading amount restricting spring 65 is deformed by being pressed by the recording disc 55 to retreat into the recess provided in the side surface of the frame 60 and, by a further loading of the recording disc 55, temporarily engages with the hole portion 52e and again retreat into the recess of the frame 60.

Then, by further inserting the recording disc 55, the lever 64b is energized by the engagement spring 64c toward the side of the loading direction A, so that it is moved together with the recording disc 55 to the side of the loading direction A against the biasing force of the spring portion 64d.

Then, when the recording disc 55 reaches to the predetermined position on the frame 60, it is latched by a latch mechanism (not shown) to complete the loading of the recording disc 55.

The unloading operation of the recording disc 55 will now be described. When the unloading button (not shown) is depressed, the latch is released and is moved to the side of the unloading direction B of the recording disc 55 by the biasing force of the spring portion 64d. At this time, the unloading amount restricting spring 65 engages with the hole portion 52e to limit the movement of the recording disc 55 to the side of the unloading direction B.

In the conventional flexible disc apparatus 66 which has the above-described construction, the arrangement is such that upon the unloading operation of the recording disc 55 the unloading amount restricting spring 65 is caused to move from the side opposite to the lever 64b to engage with the hole portion of the recording disc 55, the recording disc 55 is pushed to the side of the lever 64b by the unloading amount restricting spring 65, resulting in a tendency that the loading and unloading operation of the recording disc 55 will become disadvantageously unstable. Also, when the loading and unloading operation of the recording disc 55 is unstable, the unloading amount of the recording disc 55 is disadvantageously difficult.

SUMMARY OF THE INVENTION

Accordingly, an object of the present invention is to provide a flexible disc apparatus free from the above discussed problems of the conventional flexible disc apparatus.

Another object of the present invention is to provide a flexible disc apparatus in which the loading and the unloading of the recording disc can be smoothly achievede, and the disc unloading amount can be suitably limited.

With the above objects in view, the present invention resides in a flexible disc apparatus which includes a frame having a recording medium loading portion to which a recording disc having a disc-shaped recording medium is mounted, a head portion for recording information to the recording medium or reproducing a recorded information from the recording medium, a carriage portion for moving the head portion onto a predetermined track of the recording medium, a medium drive motor for rotating the recording medium, a recording medium unloading mechanism portion for unloading the recording disc, and a magnet portion for attracting a metal portion of the recording disc upon unloading of the recording disc.

The flexible disc apparatus may also include a frame having a recording medium loading portion to which a recording disc having a disc-shaped recording medium is mounted, a head portion for recording information to the recording medium or reproducing a recorded information from the recording medium, a carriage portion for moving the head portion onto a predetermined track of the recording medium, a medium drive motor for rotating the recording medium, a recording medium unloading mechanism portion for unloading the recording disc, and a unloading amount restricting spring portion arranged to be engageable with a recess portion positioned substantially on a central axis of the recording disc extending along the loading and unloading direction of the recording disc, the unloading amount restricting spring portion comprising a first engagement portion facing toward the side of the loading direction of the recording disc and defining a first predetermined angle with respect to the recording disc and a second engagement portion facing toward the side of the unloading direction of the recording disc and defining a second predetermined angle smaller that the first predetermined angle with respect to the recording disc. The unloading amount restricting spring portion may be provided on the frame.

A flexible disc apparatus may also include a cover opposingly disposed to the frame with the recording disc interposed therebetween, and the unloading amount restricting spring portion is provided to the cover.

Alternatively, the flexible disc apparatus may include a frame having a recording medium loading portion to which a recording disc having a disc-shaped recording medium is mounted, a head portion for recording information to the recording medium or reproducing a recorded information from the recording medium, a carriage portion for moving the head portion onto a predetermined track of the recording medium, a medium drive motor for rotating the recording medium, and a recording medium unloading mechanism portion for unloading the recording disc, wherein the recording medium unloading mechanism portion comprises a medium holding portion which is arranged to be moveable along the loading and unloading direction of the recording disc and is provided with a medium holding portion which engages with one portion of the recording disc to maintain the recording disc at a predetermined space along the loading and unloading direction.

The recording disc may include a hook portion for the opening and closing motion of the shutter, the medium holding portion engages with the hook portion upon the loading and unloading of the recording disc to open and close the shutter.

The medium holding portion may include an engagement pawl portion supported by a guide shaft portion extending along the loading and unloading direction and movable along the loading and unloading direction, wherein the engagement pawl portion includes a first and a second leaf springs disposed along the loading and unloading direction, the first and second leaf springs holding therebetween the hook portion of the recording disc, thereby holding the recording disc.

The flexible disc apparatus may further comprise a dumper which abuts against a medium holding portion and elastically deforms upon the unloading of the recording disc.

The dumper portion may be a leaf spring or rubber.

BRIEF DESCRIPTION OF THE DRAWINGS

The present invention will become more readily apparent from the following detailed description of the preferred embodiment of the present invention taken in conjunction with the accompanying drawings, in which:

FIG. 11a is an explanatory plan view of another embodiment of the recording medium unloading amount restricting and showing the flexible disc apparatus in plan;

FIG. 11b is an explanatory plan view of another embodiment of the recording medium unloading amount restricting and showing the L-shaped portion of FIG. 11a in enlarged scale;

FIG. 15a is an explanatory plan view showing the recording disc;

FIG. 15*b* is an explanatory bottom view showing the recording disc;

DETAILED DESCRIPTION OF THE PREFERRED EMBODIMENTS

Figure 1:
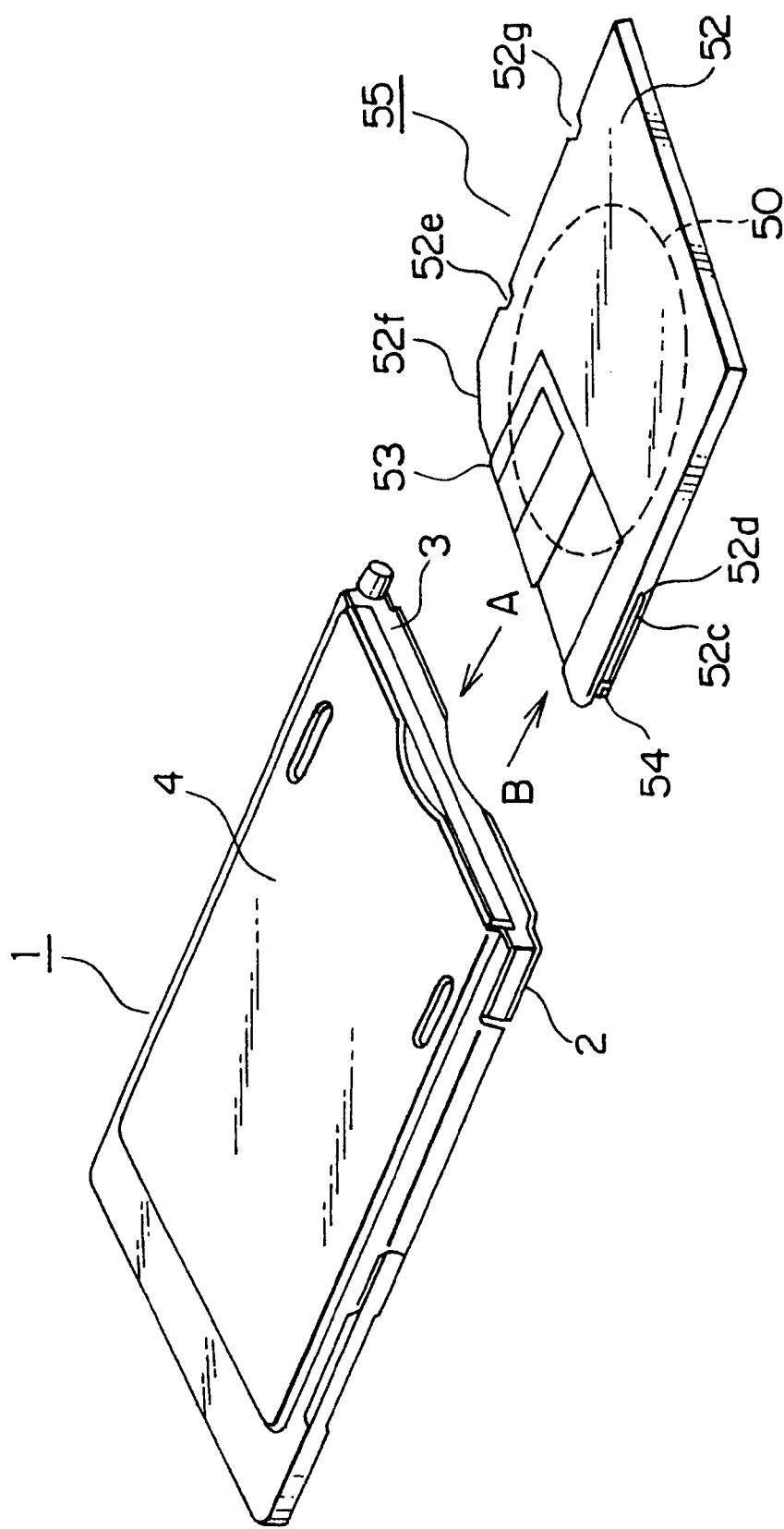
FIG. 1 is an explanatory view showing the flexible disc apparatus of the first embodiment of the present invention.
Figure 2:
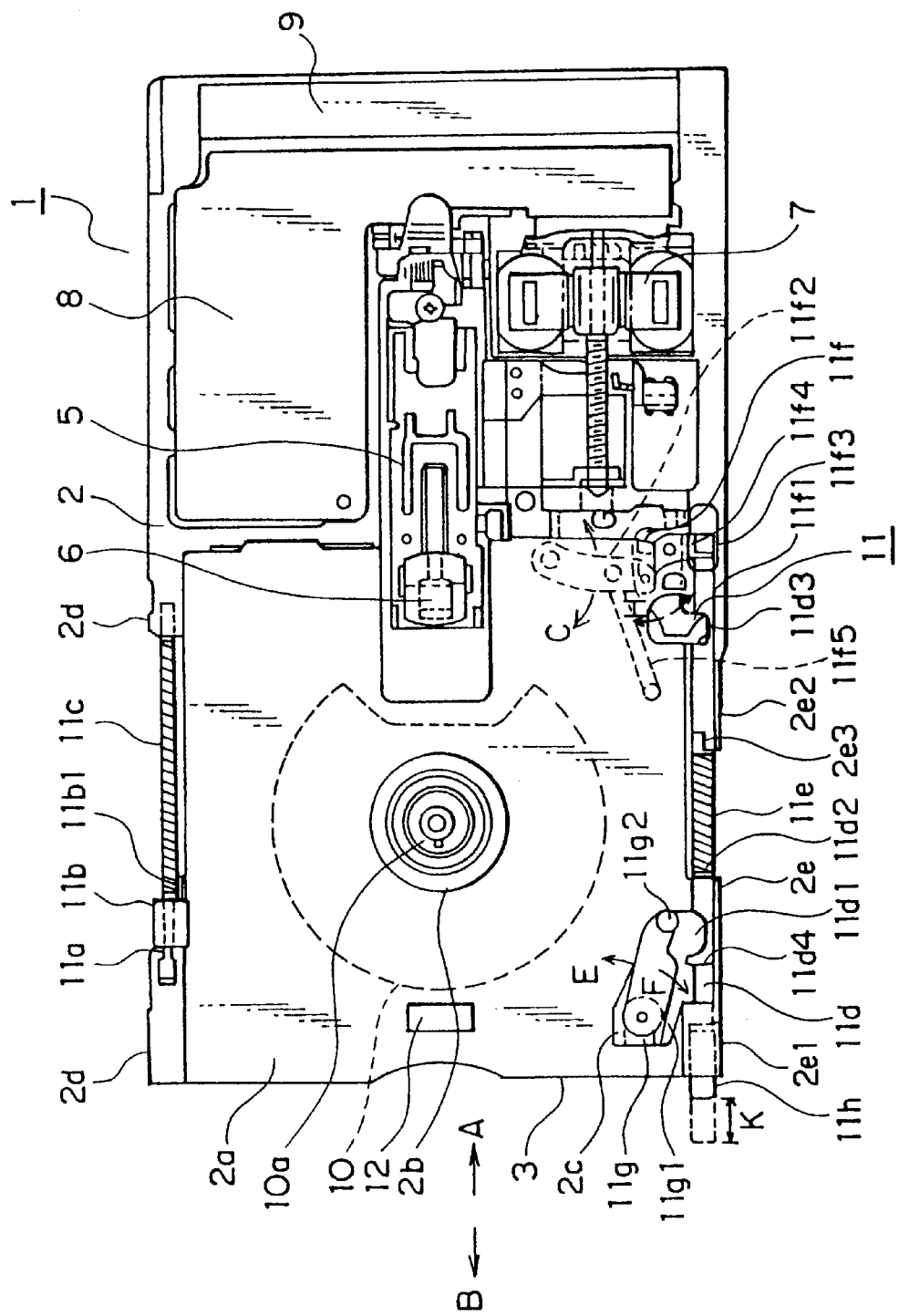
FIG. 2 is a plan view of the flexible disc apparatus shown in FIG. 1.

The flexible disc apparatus of the present invention will now be described in terms of one embodiment thereof. FIG. 1 is an explanatory view showing the flexible disc apparatus of the first embodiment of the present invention and FIG. 2 is a plan view of the flexible disc apparatus shown in FIG. 1. In the figures, the same reference characters shown in FIG. 15 designate identical or corresponding components and their description will be omitted.

Reference numeral 1 is a flexible disc apparatus (which usually referred to as FDD hereinafter), the arrangement being such that a recording disc 55 is removably mounted for recording information on the recording disc 55 or reproducing the recorded information. 2 is a frame disposed to the FDD 1, 3 is a panel surface disposed to the frame 2 and 4 is a cover disposed to the FDD 1 and is made of an iron sheet material for serving as a magnetic shield.

In FIG. 2, 2*a* is a recording medium loading portion disposed to the frame 2 to which the recording disc 55 is mounted at a predetermined position. 2*b* is a through hole portion provided in the frame 2 to which a chucking portion 10*a* is inserted. 2*c* is a recessed portion provided in the recording medium mounting portion 2*a*, 2*d* is a guide securing portion provided in the frame 2 on one side of the recording medium loading portion 2*a*, to which a guide shaft portion 11*a* is secured.

Also, 2*e* is a shaft support portion disposed to the other side of the frame 2 opposite to the recording medium loading portion 2*a* and comprises a through hole portion 2*e*1 extending along the loading direction A or the unloading direction B (hereinafter the loading direction A and the unloading direction B both are referred to as loading and unloading direction), a groove portion 2*e*2 along the loading and unloading direction and an engagement portion 2*e*3, thereby supporting the shaft portion 11*d* movable along the loading and unloading direction.

Also, 5 is a carriage portion disposed on the frame 2 movable along the direction of the diameter of the recording medium 50 and has at its one end a magnetic head portion 6 for recording information to the recording medium 50 and reproducing the recorded information. 7 is a stepping drive motor mounted to the frame 2 for step-moving the carriage portion 5 in the radial direction of the recording medium 50.

Reference numeral 8 is a control portion, which instructs the magnetic head 6 to record information or to reproduce the recorded information and which controls the drive of the stepping drive motor 7, for example. 9 is an interface portion electrically connected to the control portion 8 for supplying and receiving signals to and from an external circuit (not shown).

Also, 10 is a recording medium drive motor disposed to the frame 2 which holds the recording medium 50 by the chucking portion 10*a* for rotating the recording medium 50. The recording medium drive motor 10 is provided on the back side of the recording medium loading portion 2*a* with a stator (not shown), a rotor (not shown), a coil (not shown) wound on the stator and the like, and only the chucking portion 10*a* is inserted into the through hole portion 2*b* for holding the recording medium 50.

Also, 11 is a recording medium unloading mechanism for loading and unloading the recording disc 55, 11*a* is a guide shaft portion secured to a guide securing portion 2*c*, the mechanism being disposed along the loading and unloading direction. 11*b* is an engagement portion having a through hole extending in the loading and unloading direction into which the guide portion 11*a* is inserted so that it is movable in the loading and unloading direction. 11*b*1 is a pawl portion disposed to the engagement portion 11*b* to engage with the hook 54. 11*c* is a spring portion disposed to usually bias the engagement portion 11*b* toward the unloading direction B.

The 11*d* is a shaft portion supported by the shaft support portion 2*e* so as to be movable along the loading and unloading direction of the recording disc 55. Also, the shaft portion 11*d* achieves the positioning of the recording disc 55 and the release of the positioning. 11*d*1 is a recessed portion disposed to the shaft portion 11*d* to open to the side of the guide shaft portion 11*a*. The recessed portion 11*d*1 is tapered at its end portions on each side of the loading direction A and the unloading direction B.

Also, 11*d*2 is a spring receiving portion disposed to the shaft portion 11*d* and is always biased in the unloading direction B by the spring portion 11*e*. 11*d*3 is a notch portion disposed to the shaft portion 11*d* and has formed therein a notch opening on the side of the guide shaft portion 11*a* so that it engages the latch pawl portion 11*f*1 upon the unloading of the recording disc 55. 11*d*4 is a stopper portion which prevents the shaft portion 11*d* from being pulled out of the shaft support portion 2*e* in the unloading direction B.

11*e* is a spring portion which abuts against the spring receiving portion 11*d*2 at its one end and against the engagement portion 2*e*3 to always urge the shaft portion 11*d* toward the unloading direction B.

Also, 11*f* is a latch portion having a latch pawl portion 11*f*1 which is rotatably supported from the frame 2 and which, upon unloading of the recording disk 55, engages the notch portion 11*d*3 to prevent the shaft portion 11*d* from being moved in the unloading direction B. 11*f*2 is a latch restriction plate disposed on the latch portion 11*f* and having one end rotatably supported to the frame 2.

11*f*3 is a latch pin disposed on the other end of the latch restriction plate 11*f*2 and projecting above the recording medium loading portion 2*a* and engages an elongated hole 11*f*4 formed in the latch pawl portion 11*f*1. 11*f*5 is a spring portion disposed on the latch portion 11*f* for always urging the latch restriction plate 11*f*2 to rotate in a direction indicated by an arrow C.

Since the latch restriction plate 11*f*2 is always urged to rotate in the direction of the arrow C by the spring portion 11*f*5, the latch pin 11*f*3 always urges the latch pawl portion 11*f*1 to rotate in the direction shown by an arrow D through the engagement against the end of the elongated hole 11*f*4 at the side of the unloading direction B.

The reference numeral 11*g* is a stopper portion rotatably supported by the frame 2 within the recess portion 2*c* and urged by the leaf spring 11*g*1 to rotate in a direction of an arrow E. The stopper portion 11*g* maintains the recording medium 50 a predetermined position by the pin 11*g*2 on one end thereof, being pressed against the shaft portion 11*d*.

The reference numeral 11*h* is a button portion secured to a projecting end portion of the shaft portion 11*d* (that is, the side of the unloading direction D of the shaft portion 11*d*). The recording medium unloading mechanism portion 11 comprises the components designated by the reference characters 11a–11h.

Also, the reference numeral 12 is a magnet portion, embedded within the frame 2 in flash with the recording medium loading portion 2a of the frame 2 and substantially on the central line of the FDD 1 along the loading and unloading direction of the recording disc 55.

The FDD 1 includes the components designated by the reference numerals 2–12.

Operation

Figure 3:
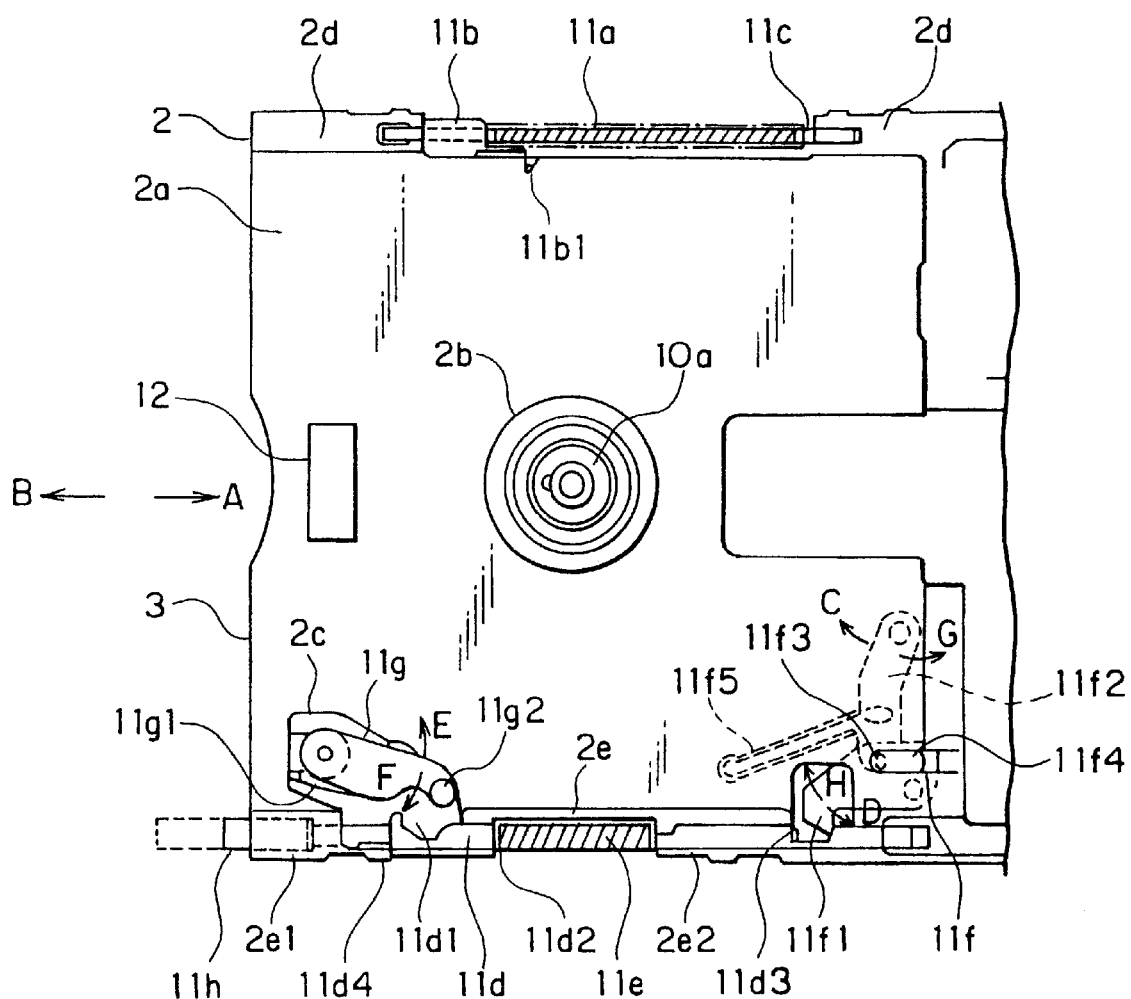
FIG. 3 is an explanatory view showing the state in which the recording medium is to be loaded.
Figure 4:
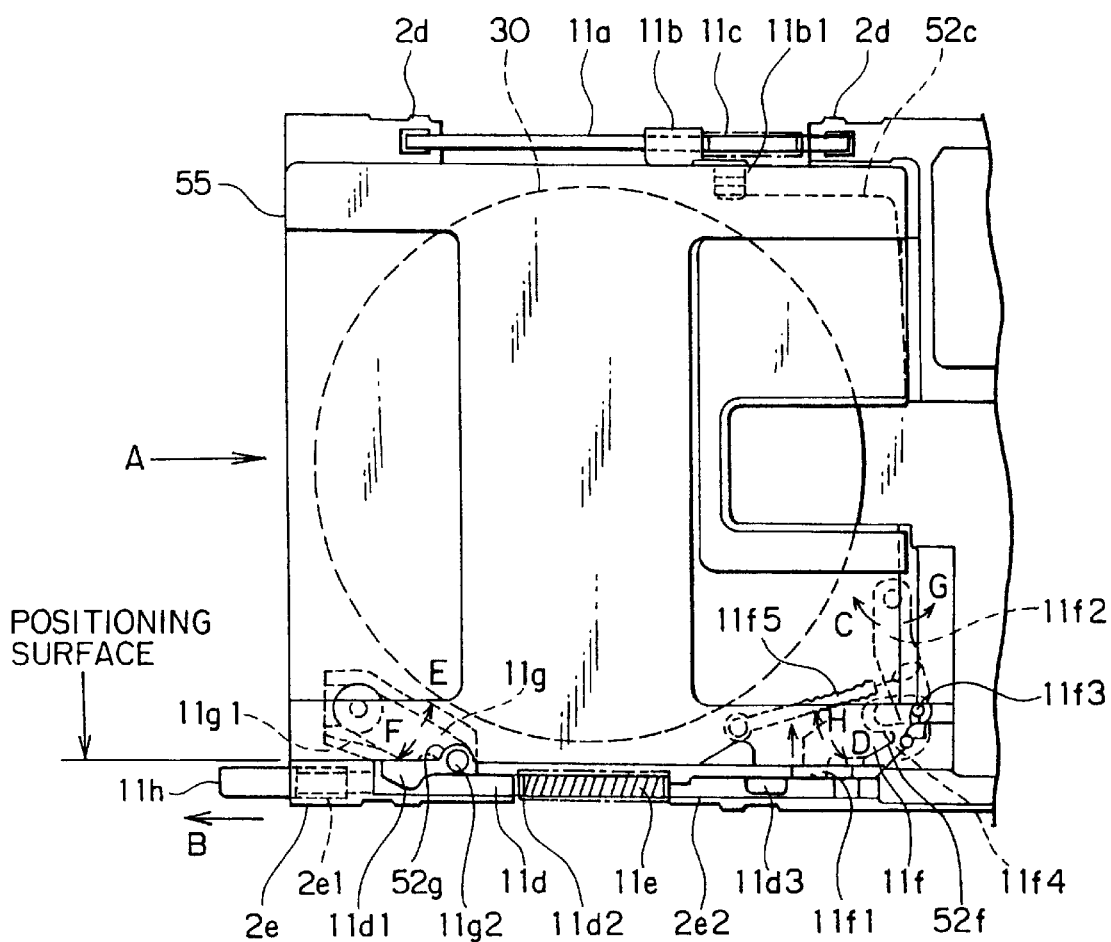
FIG. 4 is an explanatory view showing the state in which the recording medium is loaded.
Figure 5:
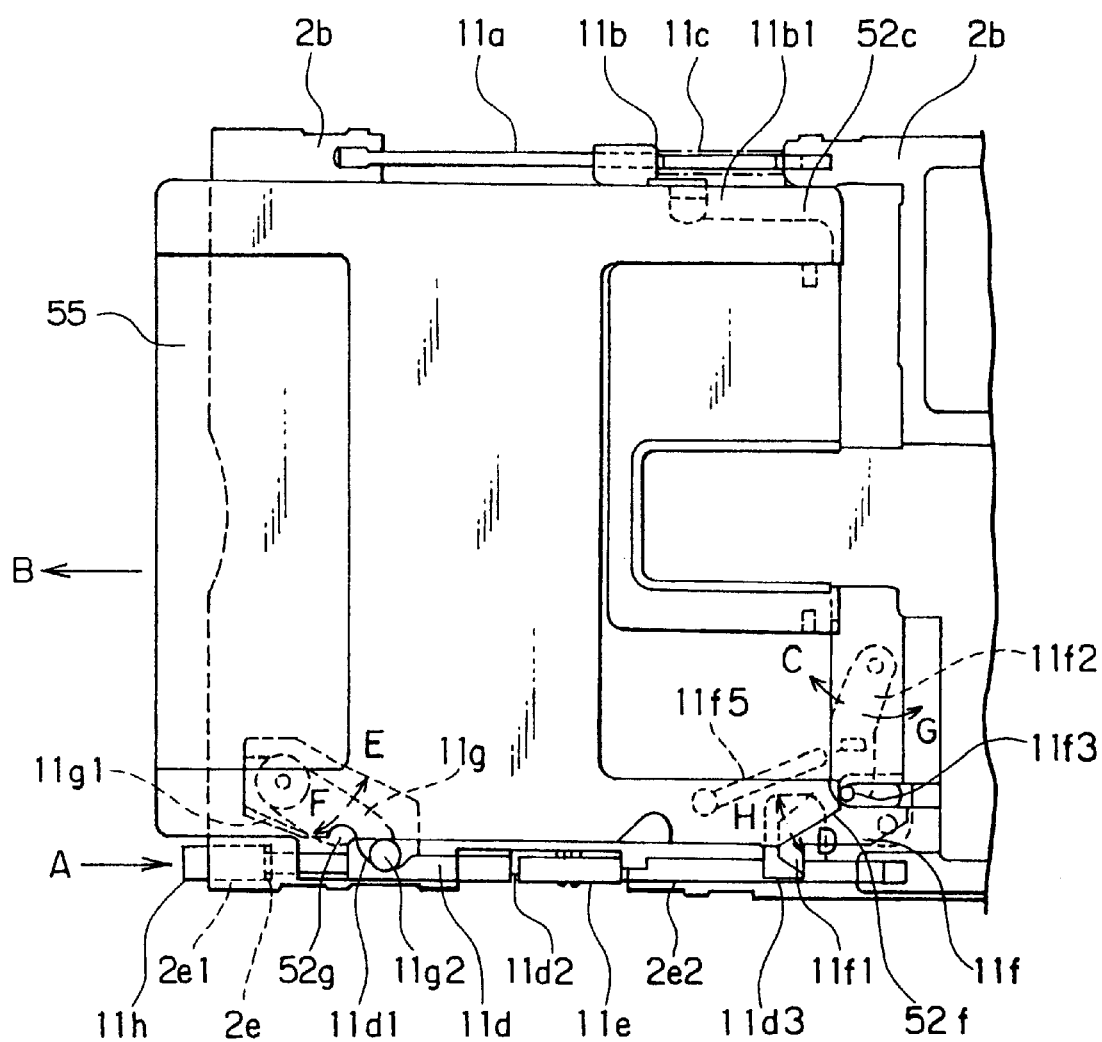
FIG. 5 is an explanatory view showing the recording medium loading and unloading operation.
Figure 6:
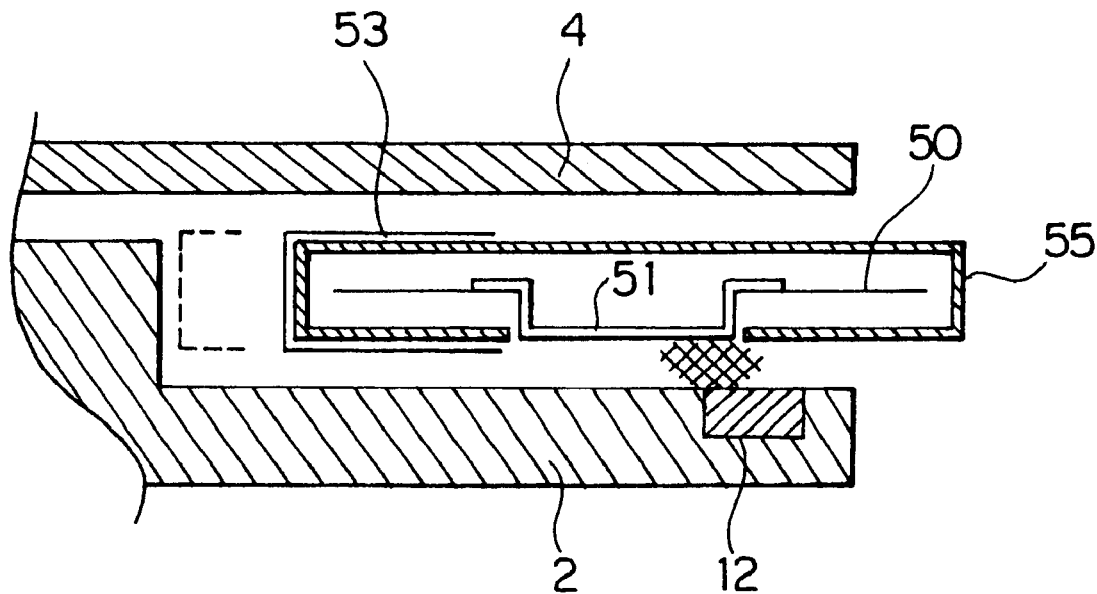
FIG. 6 is an explanatory view showing the operation of the magnet portion upon unloading operation.

The operation of the flexible magnetic disc apparatus of the present invention will now be described. FIGS. 3, 4 and 5 are views for explaining the loading operation and FIG. 3 being an explanatory plan view showing the flexible magnetic disc apparatus before the recording medium is loaded, FIG. 4 being an explanatory plan view showing the flexible magnetic disc apparatus with the recording medium loaded and FIG. 5 being an explanatory plan view showing the flexible magnetic disc apparatus with the recording medium being unloaded. FIG. 6 is an explanatory perspective view of the button portion showing the function of the button portion against an unnecessary external force. In the figures, the reference numerals identical to or the same as those in FIGS. 1 and 2 designate identical or corresponding components and their explanation will be omitted.

The loading operation of the recording medium 55 will now be described. As shown in FIG. 3, when there is no recording disc 55, the shaft portion 11d is prevented from being moved by the latch portion 11f and is positioned in the loading direction A. Also, the engaging portion 11b is urged in the unloading direction B by the spring portion 11c and is positioned in the unloading direction B.

When the recording disc is inserted into the FDD 1 in the loading direction A from the panel surface 3, the hook 54 engages the pawl portion 11ba of the engagement portion 11b1. Since the hook 54 is restricted by the urging force of the spring portion 11c to move in the loading direction A, the shutter 53 connected to the hook 54 through the wire (not shown) moves as the recording disc 55 is inserted to open the window portion 52b. The further loading of the recording disc 55 causes the hook 54 to abut against the end portion 52d of the groove portion 52c to move the engaging portion 11b in the loading direction A against the biasing force of the spring portion 11c.

At this time, the recording disc 55 is inserted with the bottom and the top surfaces of the recording medium cartridge portion 52 slide along the recording medium loading portion 2a and the cover 4. Also, while the recording disc 55 is attracted by the magnet portion 12 at its hub portion 51, since the magnet portion 12 is positioned substantially at the central line of the FDD 1, the recording disc 55 is prevented from being tilted during the loading and unloading. Therefore, the magnet 12 does not adversely affect the loading operation of the recording disc 55.

The taper portion 52f on the other side of the recording medium cartridge portion 11g engages the pin 11g2 of the stopper portion 11g and its slope causes the stopper portion 11g to rotate in the direction of the arrow F against the spring force of the leaf spring 11g1. This rotation causes the pin 11g2 to be accommodate within the recessed portion 11d1 of the shaft portion 11d.

When the recording disc 50 is inserted further, the recording disc 55 abuts against the latch pin 11f3 of the latch portion 11f to push the latch pin 11f3 to the loading direction A. Since this latch pin 11f3 is mounted on the latch restriction plate 11f2 rotatable supported on the frame 2, the latch restriction plate 11f2 rotate in the direction of an arrow G against the spring force of the spring portion 11f5.

The further loading of the recording disc 55 causes the latch pin 11f3 to abut against the end on the loading direction A side of the elongated hole 11f4 to rotate the latch pawl portion 11f1 in the direction of arrow H, releasing the engagement with the notch portion 11d3. The shaft portion 11d, when the engagement between the latch pawl portion 11fa and the notch portion 11d3 is released, moves in the unloading direction B due to the spring force of the spring portion 11e. At this time, the button portion 11h secured to the projecting end portion of the shaft portion 11d projects from the panel surface 3 by a predetermined length.

As the shaft portion 11d moves in the unloading direction B, the pin 11g2 of the stopper portion 11g moves along the taper portion of the recessed portion 11d1 to come out of the recessed portion 11d1 and accommodate within the arcuate recessed portion 52g formed in the other side of the recording medium cartridge portion 52 as shown in FIG. 4. At this time, the stopper portion 11g is always urged to rotate in the direction shown by the arrow E by the leaf spring 11g1 and is restricted not to rotate in the direction of the arrow F since the pin 11g2 is in abutment with the shaft portion 11d. Therefore, the pin 11g2 stays in the recessed portion 52g, so that the recording disc 55 is positioned at a predetermined position against the urging force in the unloading direction B by the spring portion 11c acting through the engaging portion 11b.

The unloading operation of the recording disc 55 will now be described. When the projecting end of the button portion 11h projected from the panel surface 3 with the recording disc 55 loaded as shown in FIG. 4 is depressed, the shaft portion 11d is moved in the loading direction A against the spring force in the unloading direction B of the spring portion 11e. When the button portion 11h is depressed in the loading direction A; and when, as shown in FIG. 5, the recessed portion 11d1 is made oppose to the pin 11g2 of the stopper portion 11g, the stopper portion 11g rotates in the direction of the arrow F to place the pin 11g2 within the recessed portion 11d1.

Thus, since the recording disc 55 loaded within the FDD is subjected to a biasing force in the unloading direction B of the spring portion 11c through the pawl portion 11b1, the recording disc 55 is always urged in the unloading direction B so that the recessed portion 50g always urges the stopper portion 11g to rotate in the direction shown by the arrow F, so that the stopper portion 11g is rotated in the direction shown by the arrow F to accommodate the pin 11g2 the recessed portion 11d1. This results in the release of the positioned state of the recording disc 55 and the recording disc 55 is moved in the unloading direction shown by the arrow B by the spring force of the spring portion 11c through the engaging portion 11b.

Also, when the recording disc 55 is moved into the unloading direction B, the pressing force acting on the latch pin 11f3 in the loading direction A and applied from the recording disc 55 is removed, resulting in the rotation of the latch restriction plate 11f2 in the direction of the arrow C by the spring force of the spring portion 11f5. The rotation of the latch restriction plate 11f2 in the direction of the arrow C causes the latch pin 11f3 to abut against the end on the unloading direction B side of the elongated hole 11f4 to press the latch pawl portion 11f1 in the direction of the arrow D. The latch pawl portion 11f1 is rotated by the pressing force from the latch pin 11g3 in the direction of the arrow D to engage the notch portion 11d3 so that the movement of the shaft portion 11d is restricted as shown in FIG. 3.

Also, at the time of unloading operation, the magnet portion 12 attracts the hub portion 51 by its magnetic force to apply a braking force against the movement of the recording disc 55 in the unloading direction B and to stop the recording disc 55 substantially at a predetermined position.

As has been described, according to this embodiment of the flexible magnetic disc apparatus 1 of the present invention, the flexible disc apparatus includes a frame 2 having a recording medium loading portion 2a to which a recording disc 55 is mounted, a magnetic head portion 6 for recording information to the recording medium 50 or reproducing a recorded information from the recording medium 50, a carriage portion 5 for moving the magnetic head portion 6 onto a predetermined track of the recording medium 50, a medium drive motor 10 for rotating the recording medium 50, a recording medium unloading mechanism portion 11 for unloading the recording disc 55, and a magnet portion 12 for attracting a metal portion of the recording disc 55 upon unloading of the recording disc 55, whereby the magnet portion 12 attracts the hub portion 51 of the recording disc 55 to apply a braking force with respect to the movement of the recording disc 55 into the unloading direction B so that the recording disc 55 can be stopped at a substantially predetermined position to allow the unloading amount of the recording disc 55 to be restricted. Also, since the recording medium cartridge portion 52 is not pressed from its side surface by the unloading amount restriction spring 65, the tilt of the recording disc 55 can be prevented and the loading and unloading operation of the recording disc 55 can be made smooth.

Figure 7:
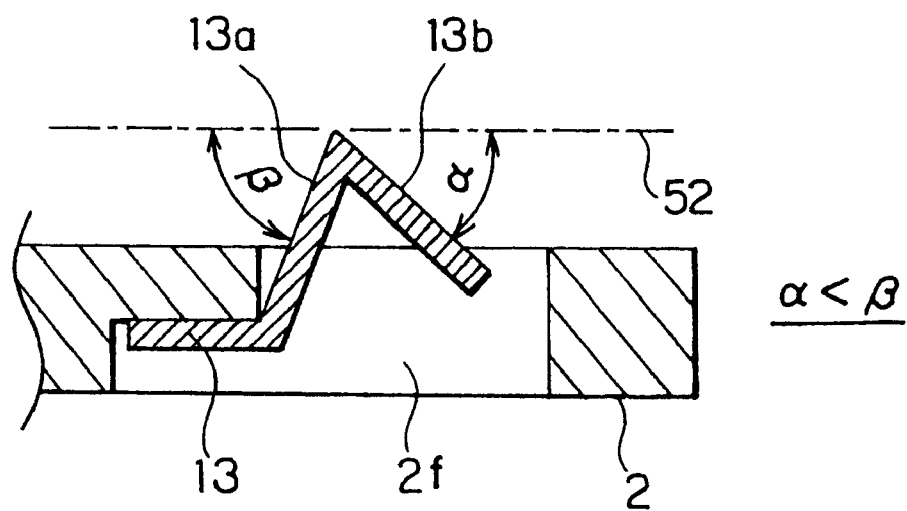
FIG. 7 is an explanatory view showing another mode of recording medium unloading amount restricting.

The operation will now be made as to another embodiment of the flexible magnetic disc apparatus of the present invention. FIG. 7 is an explanatory view of another mode of the recording medium unloading amount restriction. In the figure, the same reference numerals designate the components identical or corresponding to those shown in FIGS. 1 and 6 so that their explanation will be omitted.

The reference numeral 13 is an unloading amount restriction spring portion which has one end attached to the hole portion 2f of the frame 2 substantially on the central line of the FDD 1 extending along the loading and unloading direction of the recording disc 55 (shown In FIG. 15) and the other end disposed to project from the hole portion 2f to the cover 4 side. The other end of the unloading amount restricting spring portion 13 is formed into a hook shape and has formed therein a first engagement portion 13a which engages the recess portion or a hole portion 51a positioned substantially on a central axis of the recording disc extending along the loading and unloading direction of the recording disc and a second engagement portion 13b which engages the recording disc 55 when the recording disc 55 is being loaded. Also, the first engagement portion 13a is arranged to define a first predetermined angle β (in this embodiment, 65 degrees) with respect to bottom surface of the recording medium cartridge portion 52 of the recording disc 55 and the second engagement portion 13b defines a second predetermined angle α (in this embodiment, 40 degrees) smaller that the first predetermined angle β.

Figure 8A:
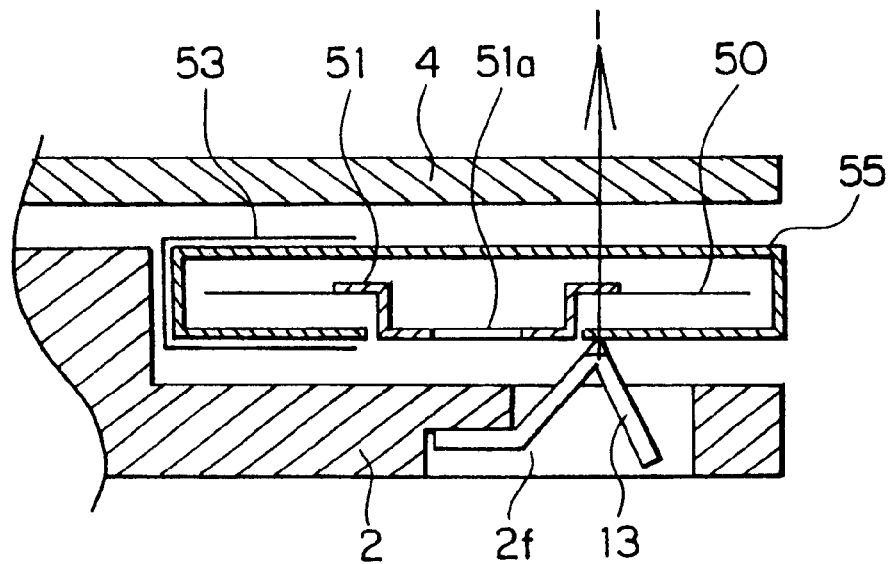
FIG. 8a is an explanatory view showing the operation of the unloading amount restricting spring upon the initiation of the unloading operation.
Figure 8B:
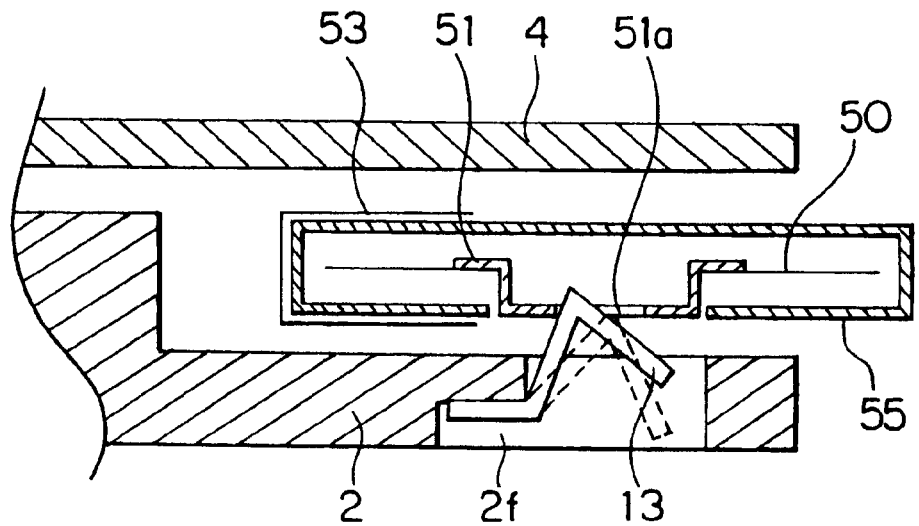
FIG. 8b is an explanatory view showing the operation of the unloading amount restricting spring when the recording disc unloading operation is stopped.

Then the operation will be described in conjunction with the drawings. FIG. 8a is an explanatory view showing the operation of the unloading amount restricting spring portion when the unloading operation is initiated and FIG. 8b is an explanatory view showing the operation of the unloading amount restricting spring when the recording disc unloading operation is stopped.

As shown in FIG. 8a, upon the unloading operation initiation of the recording disc 55, the unloading amount restricting spring 13 urges the recording disc 55 in a direction I by the spring force. When the recording disc 55 is further moved in the unloading direction shown by the arrow B, the unloading amount restriction spring portion 13 engages the hole portion 51a of the hub portion 51 (shown in FIG. 15) as shown in FIG. 8b, thereby to stop the recording disc 55 at a predetermined position upon the unloading of the recording disc 55.

It is to be noted, although not illustrated, when the recording disc 55 is loaded, the recording disc 55 engages the second engagement portion 13b facing to the side of the unloading direction B of the unloading amount restriction spring portion 13 and is loaded with the unloading amount restriction spring portion 13 retracted within the hole portion 2f. At this time, since the unloading amount restriction spring portion 13 engages the recording disc 55 on the central line of the recording disc 55 extending along the loading and unloading direction, and the second predetermined angle defined between the second engagement portion 13b and the recording medium cartridge portion 52 is 40 degrees which is shallow, the recording disc 55 can be easily moved into the loading direction A.

Also, during the unloading operation of the recording disc 55, since the first predetermined angle defined between the first engagement portion 13a facing the loading direction A of the unloading amount restriction spring portion 13 and the recording medium cartridge portion 52 is 65 degrees which is relatively steep, the unloading amount restriction spring portion 13 is easily engaged with the hole portion 51a of the hub portion 51 due to its spring force, thereby enabling the recording disc 55 to stop.

It is to be noted that the first and the second predetermined angles β and α are not limited to 65 degrees and 40 degrees, respectively, but the first predetermined angle β may be within the range of 50 degrees to 90 degrees and the second predetermined angle α may be selected within the range of 30 degrees to 45 degrees.

As has been described, according to the mode of the recording medium unloading amount restriction of the second embodiment of the present invention, the provision is made of the unloading amount restriction spring portion 13 arranged to be engageable with the hole portion 51a which is the recessed portion positioned on the center line of the recording disc 55 extending along the loading and unloading direction of the recording disc 55. The unloading amount restriction spring portion 13 comprises a first engagement portion 13a facing in the loading direction A side of the recording disc 55 and has the first predetermined angle β with respect to the recording disc 55 and the second engagement portion 13b α facing in the unloading direction B side of the recording disc 55 and has the second predetermined angle α smaller than the first predetermined angle β. Therefore, upon the loading of the recording disc 55, since the second engagement portion 13b which engages with the recording disc 55 has the second predetermined angle of 40 degrees which is shallow, the recording disc 55 can be easily loaded into the loading direction A. Also, upon the unloading of the recording disc 55, since the first engagement portion 13a which engages the recording disc 55 has the first predetermined angle of 65 degrees which is relatively steep, the unloading amount restriction spring 13 by its spring force easily engages with the hole portion 51a of the hub portion 51 to stop the recording disc 55, to restrict the unloading amount of the recording disc 55. Also, since the recording medium cartridge portion 52 is not pressed at its side by the unloading amount restriction spring 65 as has been done in the conventional flexible disc apparatus 66, the recording disc 55 can be prevented from tilting enabling a smooth loading and unloading operation of the recording disc 55.

Figure 9:
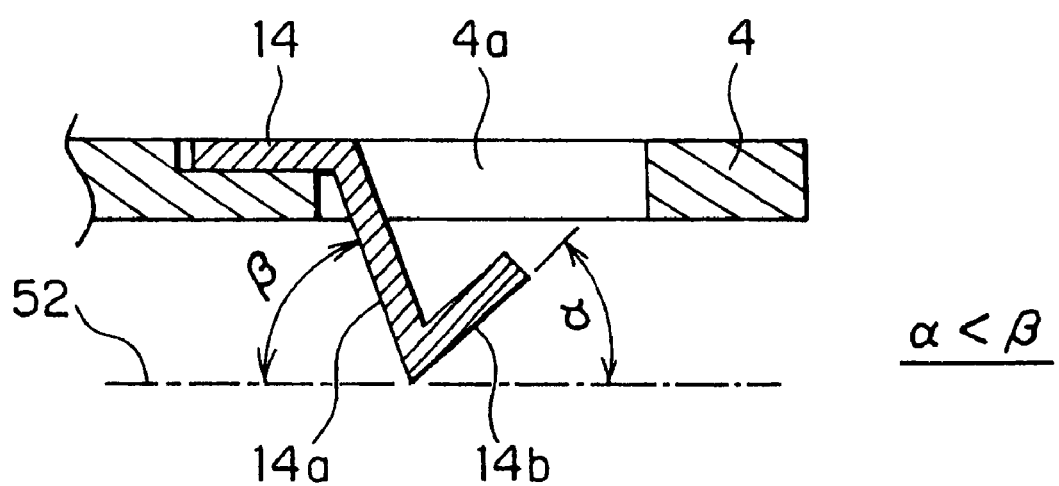
FIG. 9 is an explanatory view showing another mode of recording medium unloading amount restricting.

A further embodiment of the flexible disc apparatus of the present invention will now be described. FIG. 9 is an explanatory view showing another mode of recording medium unloading amount restriction. In the figures, the same reference numerals as those shown in FIGS. 1 to 8 designate identical or corresponding components and their explanation will be omitted.

The reference numeral 14 is an unloading amount restriction spring portion which has one end attached to the hole portion 4a of the cover 4 substantially on the central line of the FDD 1 extending along the loading and unloading direction of the recording disc 55 and has the other end disposed to project from the hole portion 4a to the frame 2 side. The other end of the unloading amount restricting spring portion 14 is formed into a hook shape and has formed therein a first engagement portion 14a which engages a shutter 53 positioned substantially on a central axis of the recording disc 55 extending along the loading and unloading direction of the recording disc and a second engagement portion 14b which engages the recording disc 55 when the recording disc 55 is being loaded. Also, the first and the second engagement portions 14a and 14b are arranged to define a first predetermined angle β and a second predetermined angle α, respectively similarly to the aforementioned first and the second engagement portions 13a and 13b.

Figure 10A:
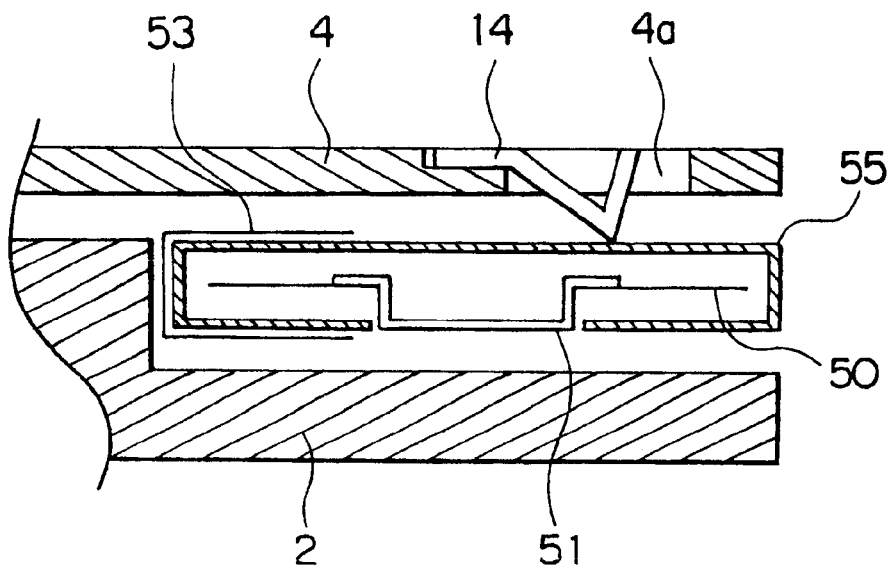
FIG. 10a is an explanatory view showing the operation of the unloading amount spring illustrating when the unloading operation is initiated.
Figure 10B:
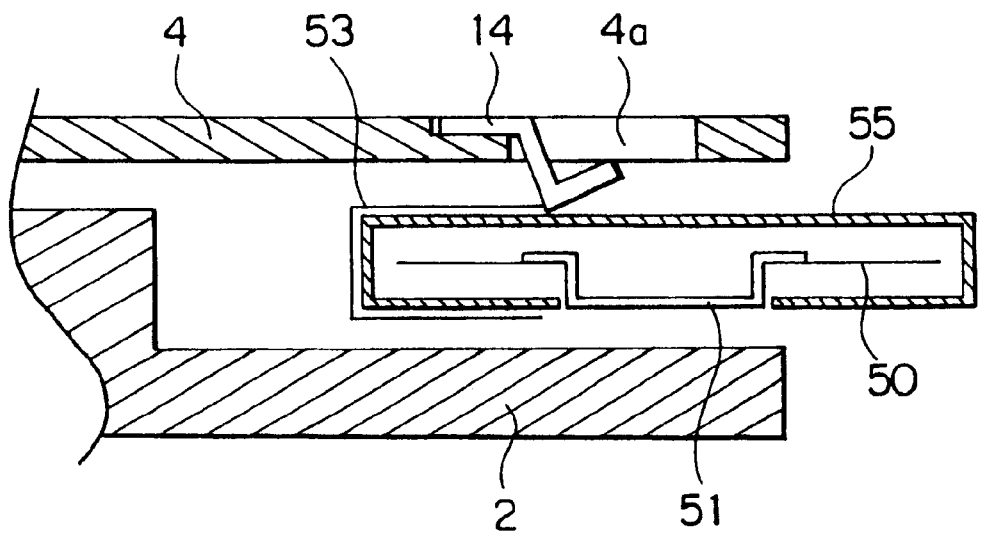
FIG. 10b is an explanatory view showing the operation of the unloading amount spring illustrating when the recording medium unloading operation is stopped.

Then the operation will be described in conjunction with the drawings. FIG. 10a is an explanatory view showing the operation of the unloading amount spring illustrating when the unloading operation is initiated, and FIG. 10b is an explanatory view showing the operation of the unloading amount spring illustrating when the recording medium unloading operation is stopped.

As shown in FIG. 10a, upon the unloading operation initiation of the recording disc 55, the unloading amount restricting spring 14 urges the recording disc 55 in a direction I by the spring force. When the recording disc 55 is further moved in the unloading direction shown by the arrow B as shown in FIG. 10b, the unloading amount restriction spring portion 14 engages the shutter 53 to stop the recording disc 55 at a predetermined position upon the unloading of the recording disc 55.

According to this mode of recording medium unloading restriction of this embodiment, similar advantageous results similar to those of the recording medium unloading restriction mode described in the above-described second embodiment of the present invention.

The description will now be made as to a further embodiment of the flexible disc apparatus of the present invention. FIG. 11a is an explanatory plan view of another embodiment of the recording medium unloading amount restricting and showing the flexible disc apparatus in plan, and FIG. 11b is an explanatory plan view of another embodiment of the recording medium unloading amount restricting and showing the L-shaped portion of FIG. 11a in enlarged scale. In the figures, the same reference numerals as those shown in FIGS. 1 to 10 designate identical or corresponding components and their explanation will be omitted. The reference numeral 15 is a recording medium holding portion having a through hole extending in the loading and unloading direction to which the guide portion 11a is inserted and made movable in the loading and unloading direction. This recording medium holding portion 15 is the one disposed to the recording medium unloading mechanism portion 11 in place of the engagement portion 11b (shown in FIG. 2).

Also, 15a is a engagement pawl portion disposed to the recording medium holding portion 15 and having a first and a second leaf spring pieces 15a1 and 15a2 disposed in the loading and unloading direction. This engagement pawl portion 15a is flexed in the directions J and K about the pivot portion 15b.

Also, the first leaf spring 15a1 is formed to project to the side of the shaft portion 11d. The second leaf spring portion 15a2 is shaped into a hook portion and positioned at a position closer to the side of the unloading direction B than the first leaf spring portion 15a1 and is formed to project to the side of the shaft portion 11d so that the projecting tip portion is larger than the projection starting portion.

Figure 12A:
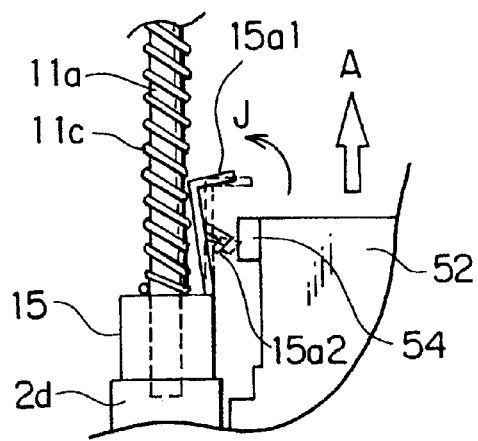
FIG. 12a is an explanatory view showing the operation of the medium holding portion in which the engagement pawl portion is swung by the hook.
Figure 12B:
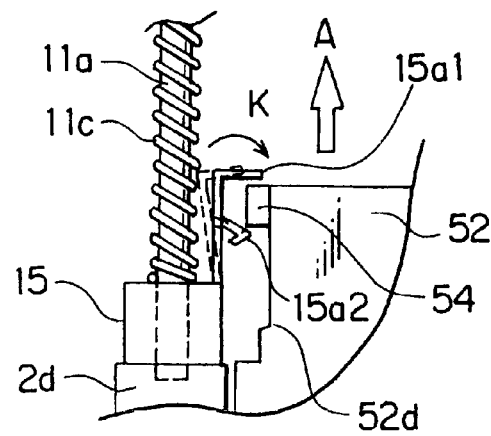
FIG. 12b is an explanatory view showing the operation of the medium holding portion in which the engagement pawl portion holds the hook therebetween.
Figure 12C:
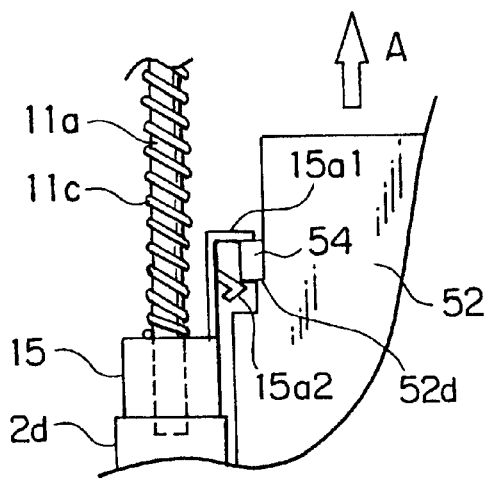
FIG. 12c is an explanatory view showing the operation of the medium holding portion in which the engagement pawl portion is moving the shutter.

The operation will now be described in conjunction with the drawings. FIG. 12a is an explanatory view showing the operation of the medium holding portion 15 in which the engagement pawl portion 15A is swung by the hook. FIG. 12b is an explanatory view showing the operation of the medium holding portion 15 in which the engagement pawl portion 15A holds the hook 54 therebetween. FIG. 12c is an explanatory view showing the operation of the medium holding portion 15 in which the engagement pawl portion 15A2 is moving the shutter, and FIG. 12d is an explanatory view showing the operation of the medium holding portion in which the medium holding portion is moving.

The description will be made as to the operation of unloading of the recording disc 55. When the recording disc 55 is inserted into the FDD 1, as shown in FIG. 12a, the hook 54 abuts against the second leaf spring piece 15a2 to reachable move the engagement pawl portion 15a in the direction shown by an arrow J. The further loading of the recording disc 55 causes the engagement between the hook 54 and the second leaf spring piece 15a2 is released and the engagement pawl portion 15a is flexed by its spring force in the direction shown by an arrow K, thereby to hold the hook 54 between the first and the second leaf spring pieces 15a1 and 15a2 to hold the loading and unloading direction side of the hook 54 as shown in FIG. 12b. That is, the recording medium holding portion 15 holds the recording disc 55. It is to be noted that the hook 54 can be easily held by the first and the second leaf spring pieces 15a1 and 15a2 therebetween because the second leaf spring portion 15a2 is formed to project on the side of the shaft portion 11d so that its projecting end portion is larger than the projection base portion.

Then, when the recording disc 55 is further inserted, the recording medium holding portion 15 does not move in the loading direction A due to the biasing force of the spring portion 11c, so that the hook 54 is moved as shown in FIG. 12c and the recording disc 55 is moved in relation thereto, whereby the shutter 53 is moved to open the window portion 52b.

Figure 12D:
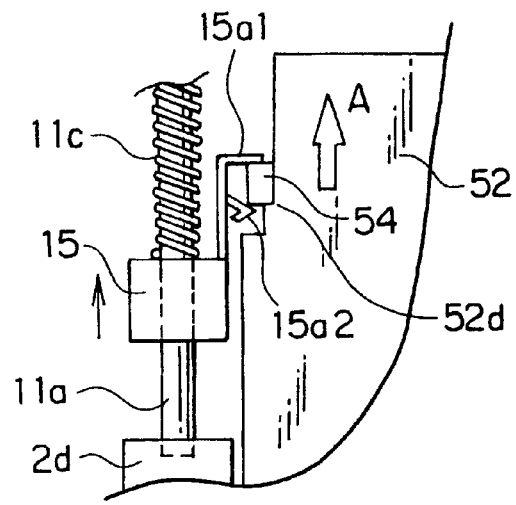
FIG. 12d is an explanatory view showing the operation of the medium holding portion in which the medium holding portion is moving.

By further inserting the recording disc 55, the hook 54 abut against the end portion 52d of the groove portion 52c and, as shown in FIG. 12d, the recording medium holding portion 15 is moved over a predetermined distance in the loading direction shown by the arrow A against the urging force of the spring portion 11c with the recording disc 55 remaining in the held position. The recording disc 55 is positioned on the recoding medium loading portion 2a by the recording medium unloading mechanism portion 11.

Then, the unloading operation of the recording disc 55 will now be described. When the button portion 11h (shown in FIG. 2) is pressed in the loading direction shown by the arrow A, the unloading operation of the recording disc 55 as described in connection with the first embodiment is started. At this time, since the recording disc 55 is held at its hook 54 by the first and the second leaf spring pieces 15a1 and 15a2 of the recording medium holding portion 15, the recording disc 55 is restricted about its movement in the unloading direction B beyond the predetermined position at which the recording medium holding portion 15 reaches the terminal end at the side of the unloading direction B.

Thereafter, when the recording disc 55 is pulled with a predetermined force or greater, the engagement pawl portion 15a flexes in the direction of the arrow K to permit the hook 54 on the unloading direction B, thus allowing the recording disc 55 to be pulled out.

As has been described, according to the mode of recording medium unloading amount restriction of the fourth embodiment, the recording medium unloading mechanism portion 11 is provided with the recording medium holding portion 15 which is movably formed along the loading and unloading direction of the recording disc 55 and which engages the hook 54 which is a part of the recording disc 55 to hold the recording disc 55 over a predetermined interval along the loading and unloading direction, so that the recording disc 55 is restricted about its unloading amount at the predetermined position in the unloading direction B to be stopped to restrict the amount of unloading of the recording disc. Also, upon restricting the unloading amount, the hook 54 alone is engaged, so that the loading and unloading operation of the recording disc 55 can be made smooth.

Also, the recording medium holding portion 15 which is the unloading amount restricting member of the recording disc 55 also serves as a shutter opener for moving the shutter 53 therefore, the number of parts can be reduced.

Figure 13A:
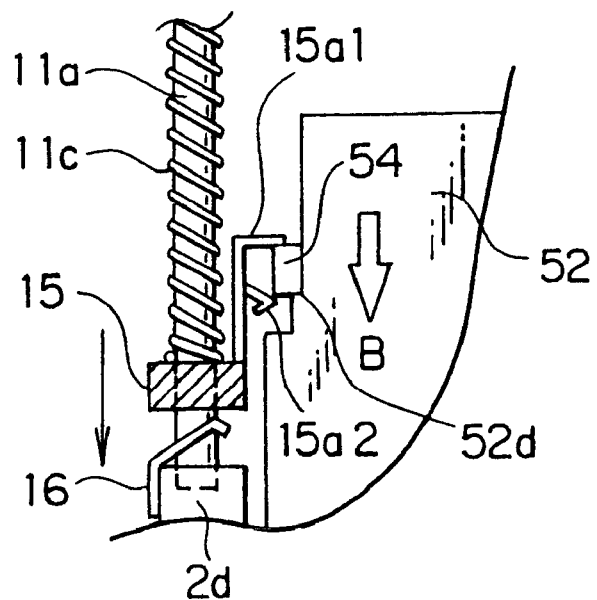
FIG. 13a is an explanatory view showing another mode of the medium unloading amount restricting in which the dumper portion is before operated.
Figure 13B:
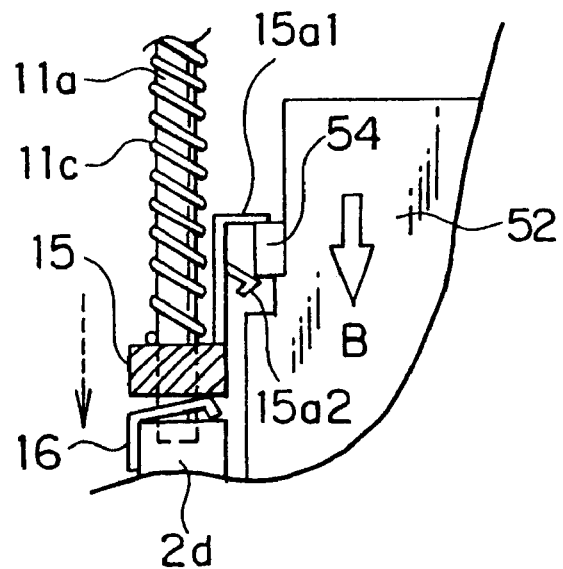
FIG. 13b is an explanatory view showing another mode of the medium unloading amount restricting in which the dumper portion is in operation.

The description will now be made as to a further embodiment of the flexible disc apparatus of the present invention. FIG. 13a is an explanatory view showing an alternative mode of the medium unloading amount restricting member, wherein dumper portion is shown prior to operation FIG. 13b is an explanatory view showing another mode of the medium unloading amount restricting member, wherein the dumper portion is in operation. In the FIG. 13a, and the same reference numerals used in FIGS. 1 to 12 designate identical or corresponding components and their description will be omitted. The reference numeral 16 is a leaf spring which is a dumper portion and is secured to the guide securing portion 2d.

The leaf spring 16 elastically deforms as shown in FIG. 13b upon the unloading of the recording disc 55 by being abutted by the recording medium holding portion 15 to decelerate the moving speed of the recording medium holding portion 15 in the unloading direction B. Therefore, the recording disc 55 flexes the engagement pawl portion 15a by its elasticity to achieve a reliable stop of the recording disc 55 at a predetermined position without releasing the holding state, allowing the unloading amount of the recording disc 55 to be predetermined.

Figure 14A:
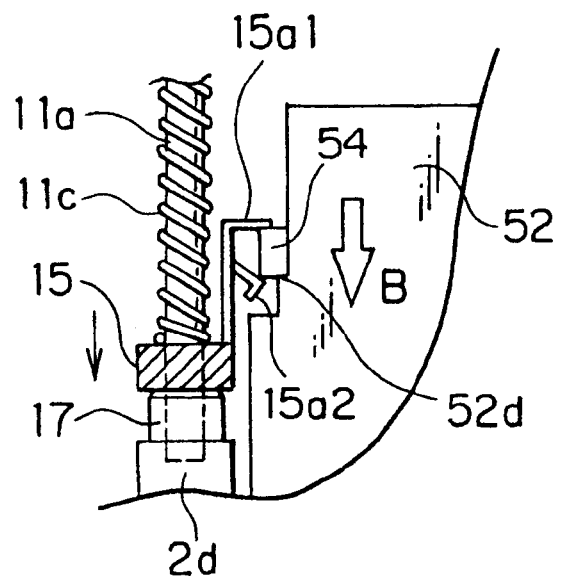
FIG. 14a is an explanatory view showing another mode of the dumper portion in which the dumper portion is before being operated.
Figure 14B:
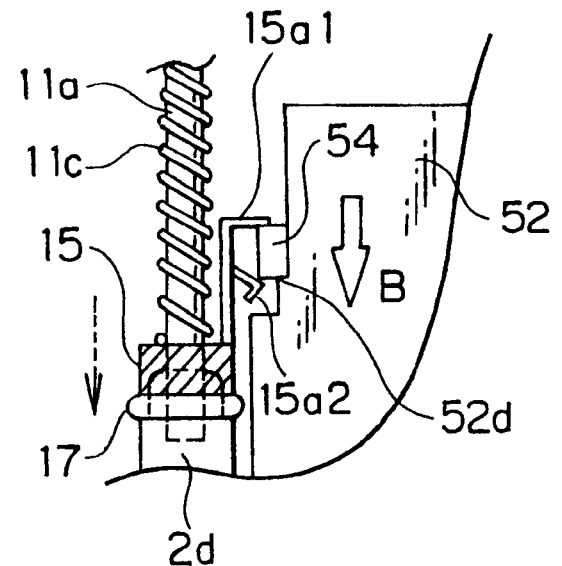
FIG. 14b is an explanatory view showing another mode of the dumper portion in which the dumper portion is being operated.
Figure 16A:
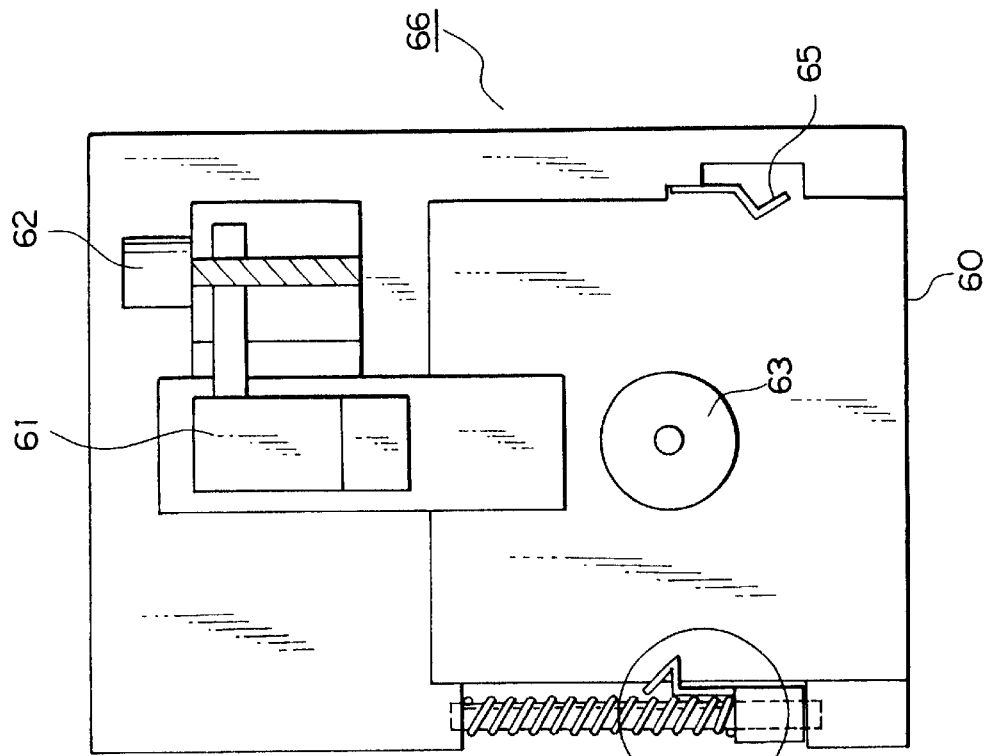
FIGS. 16(*a*) and (*b*) are explanatory views.
Figure 16B:
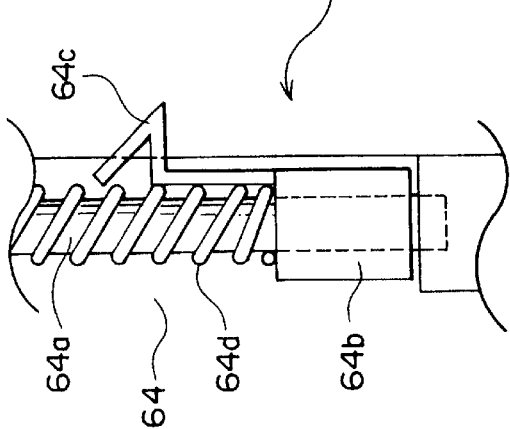
Figure 17:
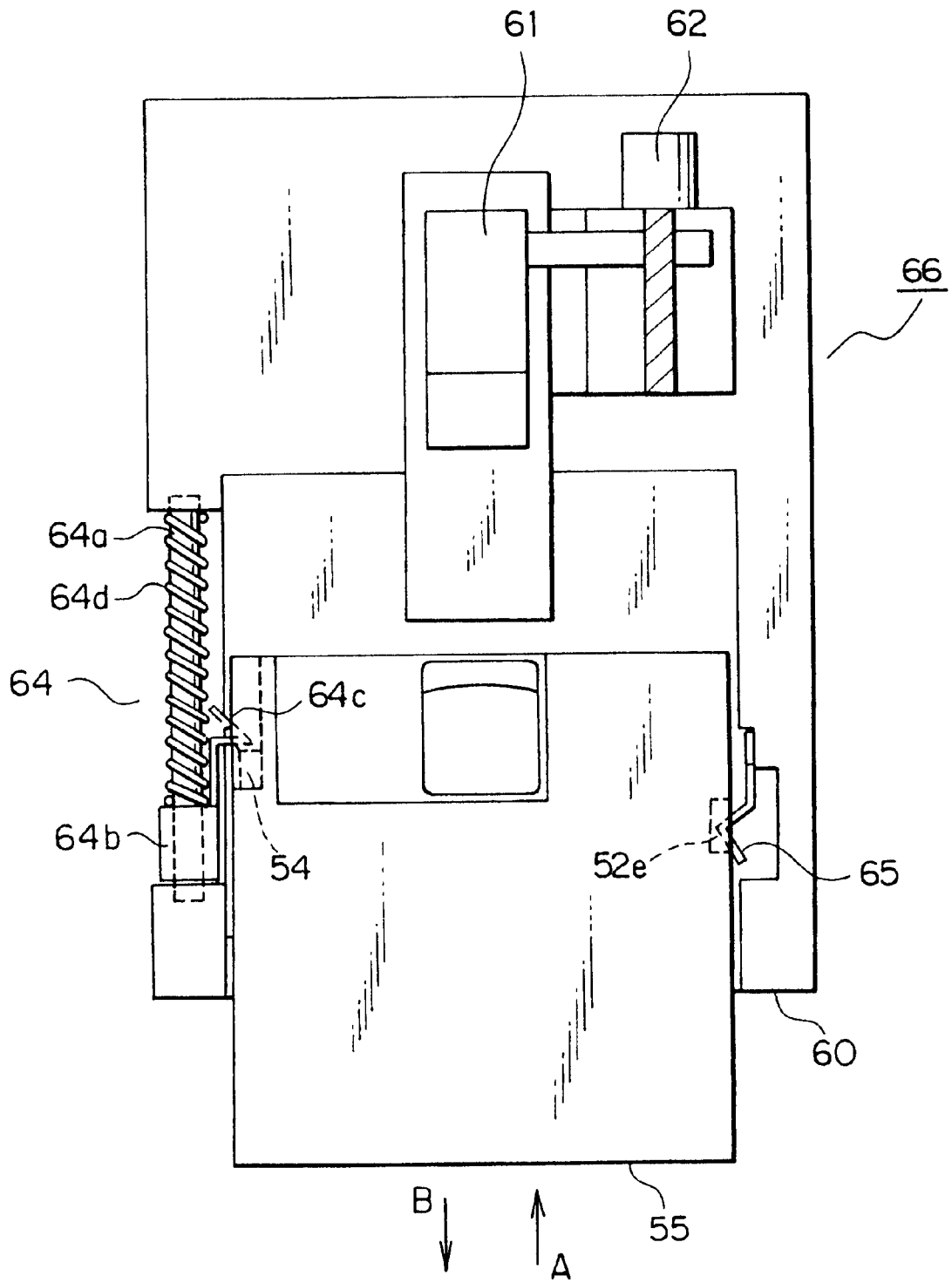
FIG. 17 is an explanatory view showing the recording medium loading and unloading motion (feeding and releasing motion).

It is to be noted that the dumper portion may not be limited to the leaf spring 16 and rubber may be used. FIG. 14a is an explanatory view showing another mode of the dumper portion in which the dumper portion is shown prior to operation and FIG. 14b is an explanatory view showing another mode of the the dumper portion when the dumper portion is being operated. In the FIGS. 14a and 14b, the same reference numerals as those in FIG. 13 designate identical or corresponding components and their description will be omitted. The reference numeral 17 is a dumper portion made of rubber, which is formed in a ring shape with its inner diameter portion passed through the guide shaft portion 11a and is secured to the guide securing portion 2d.

When the portion 17 is made of rubber, it abuts against the recording medium holding portion 15 and deforms as shown in FIG. 14b upon the unloading of the recording disc 55 to decelerate the moving speed in the unloading direction shown by the arrow B. Therefore, the recording disc 55 by its inertia force causes the engagement pawl portion 15a to flex in the direction indicated by the arrow K to stop the recording disc 55 reliably at a predetermined position without releasing the holding state, whereby the unloading amount of the recording disc 55 can be reliably restricted.

As has been described, according to the present invention, the flexible disc apparatus comprises a frame having a recording medium loading portion to which a recording disc having a disc-shaped recording medium is mounted, a head portion for recording information to the recording medium or reproducing a recorded information from the recording medium, a carriage portion for moving the head portion onto a predetermined track of the recording medium, a medium drive motor for rotating the recording medium, a recording medium unloading mechanism portion for unloading the recording disc, and a magnet portion for attracting a metal portion of the recording disc upon unloading of the recording disc. Therefore, the magnet portion attracts the metal portion of the recording disc so that the recording disc can be stopped at a substantially predetermined position to allow the unloading amount of the recording disc to be restricted. Also, since the recording medium cartridge portion is not pressed from its side surface by the unloading amount restriction spring, the tilt of the recording disc can be prevented and the loading and unloading operation of the recording disc can be made smooth.

According to the present invention, the flexible disc apparatus comprises a frame having a recording medium loading portion to which a recording disc having a disc-shaped recording medium is mounted, a head portion for recording information to the recording medium or reproducing a recorded information from the recording medium, a carriage portion for moving the head portion onto a predetermined track of the recording medium, a medium drive motor for rotating the recording medium, a recording medium unloading mechanism portion for unloading the recording disc, and a unloading amount restricting spring portion arranged to be engageable with a recess portion positioned substantially on a central axis of the recording disc extending along the loading and unloading direction of the recording disc, the unloading amount restricting spring portion comprising a first engagement portion facing toward the side of the loading direction of the recording disc and defining a first predetermined angle with respect to the recording disc and a second engagement portion facing toward the side of the unloading direction of the recording disc and defining a second predetermined angle smaller that the first predetermined angle with respect to the recording disc. Therefore, upon the loading of the recording disc, since the second engagement portion which engages with the recording disc has the second predetermined angle which is shallow, the recording disc can be easily loaded. Also, upon the unloading of the recording disc, since the first engagement portion which engages the recording disc has the first predetermined angle which is relatively steep, the unloading amount restriction spring by its spring force easily engages with the recess portion of the recording disc to stop the recording disc to restrict the unloading amount of the recording disc 55.

Also according to the flexible disc apparatus of the present invention, the unloading amount restricting spring portion is provided on the frame, so that the recording disc can be restricted about its unloading amount without being pressed at its side.

Also according to the flexible disc apparatus of the present invention, a cover is opposingly disposed to the frame with the recording disc interposed therebetween, and the unloading amount restricting spring portion is provided to the cover, so that the recording disc can be restricted about its unloading amount without being pressed at its side.

According to the present invention, the flexible disc apparatus comprises a frame having a recording medium loading portion to which a recording disc having a disc-shaped recording medium is mounted, a head portion for recording information to the recording medium or reproducing a recorded information from the recording medium, a carriage portion for moving the head portion onto a predetermined track of the recording medium, a medium drive motor for rotating the recording medium, and a recording medium unloading mechanism portion for unloading the recording disc. Also, the recording medium unloading mechanism portion comprises a medium holding portion which is arranged to be moveable along the loading and unloading direction of the recording disc and is provided with a medium holding portion which engages with one portion of the recording disc to maintain the recording disc at a predetermined space along the loading and unloading direction. Therefore, the recording disc can be restricted about its unloading amount.

Also according to the flexible disc apparatus of the present invention, the recording disc comprises a hook portion for the opening and closing motion of the shutter, the medium holding portion engages with the hook portion upon the loading and unloading of the recording disc to open and close the shutter, so that the unloading amount restricting portion and the shutter opener can be a common component, enabling the decrease of number of the components.

Also according to the flexible disc apparatus of the present invention, the medium holding portion comprises an engagement pawl portion supported by a guide shaft portion extending along the loading and unloading direction and movable along the loading and unloading direction, and wherein the engagement pawl portion comprises a first and a second leaf springs disposed along the loading and unloading direction, the first and second leaf springs holding therebetween the hook portion of the recording disc thereby to hold the recording disc. Therefore, the recording disc can be held with a simple structure.

Also according to the flexible disc apparatus of the present invention, a dumper is provided which abuts against a medium holding portion and elastically deforms upon the unloading of the recording disc, so that the moving speed of the recording medium holding portion in the unloading direction side can be decelerated, preventing the recording disc to be released from its held state by the engagement pawl portion due to its inertia, enabling the recording disc to be reliably stopped at a predetermined position, thereby to reliably restrict the unloading amount of the recording disc.

Also, according to he flexible disc apparatus of the present invention, the dumper portion is a leaf spring, so that the deceleration of the moving speed of the recording medium holding portion can be achieved with a simple structure.

Also according to the flexible disc apparatus of the present invention, the dumper portion is rubber, so that the deceleration of the moving speed of the recording medium holding portion can be achieved with a simple structure.

What is claimed is:

1. A flexible disc apparatus comprising a frame having a recording medium loading portion to which a recording disc having a disc-shaped recording medium is mounted;

a head portion for recording information to said recording medium or reproducing a recorded information from said recording medium;

a carriage portion for moving said head portion onto a predetermined track of said recording medium;

a medium drive motor for rotating said recording medium; and a recording medium unloading mechanism portion for unloading said recording disc;

wherein said recording medium-unloading mechanism portion comprises a medium holding portion which is arranged to be moveable along the loading and unloading direction of said recording disc and is provided with the medium holding portion which engages with one portion of said recording disc to maintain said recording disc at a predetermined space along said loading and unloading direction;

wherein said recording disc comprises a hook portion for the opening and closing motion of a shutter, said medium holding portion engages with said hook portion upon the loading and unloading of said recording disc to open and close said shutter;

wherein said medium holding portion comprises an engagement pawl portion supported by a guide shaft portion extending along the loading and unloading direction and movable along said loading and unloading direction, and wherein said engagement pawl portion comprises a first and a second leaf spring disposed along said loading and unloading direction, said first and second leaf springs holding therebetween the hook portion of said recording disc thereby holding said recording disc.

2. A flexible disc apparatus as claimed in claim 1, further comprising a dumper portion which abuts against a medium holding portion and elastically deforms upon the unloading of the recording disc.

3. A flexible disc apparatus as claimed in claim 2, wherein said dumper portion is rubber.

4. A flexible disc apparatus as claimed in claim 2, wherein said dumper portion is rubber.

* * * * *